US008810196B2

(12) United States Patent
Ettes et al.

(10) Patent No.: US 8,810,196 B2
(45) Date of Patent: Aug. 19, 2014

(54) INDUCTIVE CHARGER AND CHARGING METHOD

(75) Inventors: Wilhelmus Ettes, Leeuwarden (NL); Robert Paul Visser, Joure (NL); Jacob Adrianus Van Der Linden, Steenwijk (NL)

(73) Assignee: Koninklijke Philips N.V., Eindhoven (NL)

( * ) Notice: Subject to any disclaimer, the term of this patent is extended or adjusted under 35 U.S.C. 154(b) by 450 days.

(21) Appl. No.: 13/061,957

(22) PCT Filed: Sep. 1, 2009

(86) PCT No.: PCT/IB2009/053802
§ 371 (c)(1),
(2), (4) Date: Mar. 3, 2011

(87) PCT Pub. No.: WO2010/026528
PCT Pub. Date: Mar. 11, 2010

(65) Prior Publication Data
US 2011/0163714 A1 Jul. 7, 2011

(30) Foreign Application Priority Data
Sep. 5, 2008 (EP) .................................... 08163775

(51) Int. Cl.
*H02J 7/00* (2006.01)
(52) U.S. Cl.
USPC ........................................................ 320/108
(58) Field of Classification Search
USPC ........................................................ 320/108
See application file for complete search history.

(56) References Cited

U.S. PATENT DOCUMENTS

| 4,556,837 | A | * | 12/1985 | Kobayashi et al. | ........... 320/108 |
| 5,519,262 | A | | 5/1996 | Wood | |
| 6,100,663 | A | * | 8/2000 | Boys et al. | ..................... 320/108 |
| 6,972,543 | B1 | * | 12/2005 | Wells | ............................. 320/108 |
| 7,248,017 | B2 | | 7/2007 | Cheng et al. | |
| 2004/0145342 | A1 | * | 7/2004 | Lyon | ............................. 320/108 |
| 2005/0189910 | A1 | * | 9/2005 | Hui | ............................... 320/108 |
| 2007/0057581 | A1 | | 3/2007 | Miner | |
| 2007/0290654 | A1 | | 12/2007 | Govari et al. | |

FOREIGN PATENT DOCUMENTS

| DE | 10218124 A1 | 11/2003 |
| JP | 58162822 A | 9/1983 |
| JP | 10200452 A | 7/1998 |
| WO | 03052793 A2 | 6/2003 |
| WO | 2004038888 A2 | 5/2004 |

OTHER PUBLICATIONS

Hatanaka, K.: "Coil Shape in a Desk-Type Contactless Power Station System"; Journal of the Magnetics Society of Japan, 2001, vol. 25, No. 4-2, pp. 1015-1018.

* cited by examiner

Primary Examiner — Samuel Berhanu

(57) ABSTRACT

A charger for inductively charging one or more battery powered appliances simultaneously includes an external unit configured to inductively provide power to the battery powered appliances. The external unit includes two or more primary coil pairs that are arranged in a circular pattern; an AC power source for providing an alternating current (AC) to the primary coil pairs for generating a rotating magnetic field between respective primary coils of the primary coil pairs; and a processor for driving the AC power source. The one or more battery powered appliances are configured to be arranged inside the circular pattern of the external unit. Further, each appliance includes a secondary coil for enclosing part of the magnetic field and, in response, generating a current for charging the battery of the appliance.

9 Claims, 10 Drawing Sheets

INDUCTIVE CHARGER AND CHARGING METHOD

FIELD OF THE INVENTION

The present invention relates to an inductive charger and charging method. The charger is applicable for simultaneously charging one or more battery powered appliances using contact-less inductive coupling between the charger and the appliances.

BACKGROUND OF THE INVENTION

Many of today's portable appliances incorporate rechargeable batteries. Example appliances include electrical toothbrushes, electric shavers, beard trimmers, and/or depilation devices. The appliances may include other chargeable appliances also, such as cellular telephones or laptop computers.

In some of these devices, the batteries are recharged via inductive coupling rather than a direct electrical connection. Examples include the Philips Sonicare™ toothbrush, the Panasonic Digital Cordless Phone Solution KX-PH15AL and the Panasonic men's shavers ES70/40 series.

Each of these devices typically has an adaptor or charger which takes power from mains electricity, a car cigarette lighter or other sources of electrical power and converts it into a form suitable for charging the batteries. There are a number of problems associated with conventional means of powering or charging these appliances.

Both the characteristics of the batteries within each appliance and the means of connecting to them vary considerably from manufacturer to manufacturer, and from device to device. Therefore users who own several such appliances must also own several different adaptors. If users are going away on travel, they will have to bring their collection of chargers if they expect to use their devices during this time.

Chargers, whether using direct electrical connection or inductive coupling, often require users to plug a small connector into the appliance or to place the device with accurate alignment into a stand causing inconvenience.

In addition, most adaptors and chargers have to be plugged into mains sockets and hence if several are used together, they take up space in plug strips and create a messy and confusing tangle of wires.

Besides the above problems, there are additional practical problems associated with chargers having an open electrical contact. For example, such chargers cannot be used in wet environments due to the possibility of corroding or shorting out the contacts and also they cannot be used in flammable gaseous environments due to the possibility of creating electrical sparks.

Chargers which use inductive charging remove the need to have open electrical contacts hence allowing the adaptor and device to be sealed and used in wet environments. For example the electric toothbrush, the shaver and the depilation device as mentioned above are designed to be used in a bathroom. However such chargers still suffer from all other problems as described above. For example, the devices still need to be placed accurately into a charger such that the device and the charger are in a predefined relative position. The adaptors are still only designed specifically for a certain make and model of device and are still only capable of charging one device at a time. As a result, users still need to possess and manage a collection of different adaptors.

U.S. Pat. No. 7,248,017-B2 in the name of Splashpower Limited (UK) recognizes the above problems and describes a number of solutions to overcome the limitations of inductive power transfer systems which require that the appliances be axially aligned with the charger.

A relatively simple solution is to use an inductive power transfer system whereby the primary unit is capable of emitting an electromagnetic field over a large area. Users can simply place one or more devices to be recharged within range of the primary unit, with no requirement to place them accurately. For example this primary unit may consist of a primary coil encircling a large area. When a current flows through the primary coil, an electromagnetic field extending over a large area is created and devices having a secondary pickup coil can be placed anywhere within this area. This method suffers from a number of drawbacks. Firstly, the intensity of electromagnetic emissions is governed by regulatory limits. Consequently this method can only transfer power at a limited rate. Secondly, as the pick-up coil will by definition encircle a much smaller area than the primary coil, the pick-up coil will only enclose a correspondingly small part of the magnetic field that is generated by the primary coil. This so called magnetic coupling is dependent on for instance the distance, cross section and orientation of the pick-up coil in relation to the primary coil.

The magnetic coupling coefficient $k_{21}$ of the secondary coil to the primary coil is expressed as the ratio of the flux $\Phi_2$ enclosed by the secondary coil and the flux $\Phi_1$ enclosed by the primary coil:

$$k_{21}=\Phi_2/\Phi_1$$

The lower the coupling coefficient, the weaker the magnetic coupling, and the higher the current in the primary coil must be to transfer the same amount of energy. Increasing the current in the primary coil increases energy loss due to electrical resistance. To render the energy transfer efficient and to limit energy losses, it is desirable to optimize the magnetic coupling between the primary coil and the pick-up coil.

To optimize magnetic coupling, one might suggest using an array of primary coils whereby only the coils needed are activated. This method is described in a paper published in the Journal of the Magnetics Society of Japan titled "Coil Shape in a Desk-type Contactless Power Station System" (29 Nov. 2001). In an embodiment of the multiple-coil concept, a sensing mechanism senses the relative location of the secondary device relative to the primary unit. A control system then activates the appropriate coils to deliver power to the secondary device in a localized fashion. Although this method provides a solution to the problems previously listed, it does so in a complicated and costly way. The degree to which the primary field can be localized is limited by the number of primary coils and hence the number of driving circuits used. The cost associated with a multiple-coil system would severely limit the commercial applications of this concept. Non-uniform field distribution is also a drawback. When all the coils are activated in the primary unit, they sum to an equivalent of a large coil, the magnetic field distribution of which is seen to exhibit a minimum at the centre of the coil.

U.S. Pat. No. 7,248,017-B2 discloses a rechargeable battery which comprises a thin sheet of magnetic core material and a pick-up coil wound around the thin sheet. The pick-up coil is adapted to receive power inductively from an external unit. The external unit generates an electromagnetic field at or over a field generating surface. To charge the battery, the coil is placed in proximity to the field generating surface, such that a longitudinal axis of the sheet and a central axis of the coil each extend parallel to the surface. The external unit comprises a number of conductors for generating a rotating magnetic dipole along the field generating surface, such that the coil can receive power regardless of its rotational orientation.

Unlike the multiple coil design, this solution requires a simpler control system and fewer components.

Regardless of its advantages, the solution of U.S. Pat. No. 7,248,017-B2 is unfavorable due to weak coupling between the field generating surface and the pick-up coil, and the resulting power losses and low efficiency. The conductors of the external unit encircle an area that is much larger than the area enclosed by the pick-up coil. To increase the magnetic coupling, U.S. Pat. No. 7,248,017-B2 teaches to include high permeability magnetic material in the secondary device to increase the induced flux by offering a low reluctance path. Due to the weak magnetic coupling, a relatively high current is provided to the conductors. To compensate the magnetic flux generated by this current, a layer of magnetic material is present beneath the charging area to provide a return path for the flux.

OBJECT OF THE INVENTION

In view of the above, there is a need for a universal inductive charger, wherein a single primary unit can supply power to different secondary devices thereby eliminating the need for a collection of different adaptors and chargers, having an increased magnetic coupling efficiency.

SUMMARY OF THE INVENTION

The present invention therefore provides an inductive charger to inductively provide power to one or more battery powered appliances, each appliance comprising a secondary coil for enclosing part of a magnetic field and in response generating a current for charging a battery of the appliance, the charger comprising:
  two or more primary coil pairs that are arranged in a circular pattern, wherein the circular pattern is adapted for enclosing the one or more secondary coils of the appliances, and
  an AC power source for providing an alternating current (AC) to the primary coil pairs for generating a rotating magnetic field between respective primary coils of the primary coil pairs.

The inductive charger of the invention has the following features. It is universal, i.e. a single charger can supply power to different appliances with different power requirements thereby eliminating the need for a collection of different adaptors and chargers. It is convenient, as the charger allows the appliances to be placed anywhere within the circular pattern of primary coils, thereby eliminating the need for plugging-in or placing the appliances accurately relative to the charger. The charger can supply power to a number of appliances with different power requirements at the same time. The charger offers flexibility for use in different environments, as no direct electrical contact is required thereby allowing use in wet, gaseous, clean and other atypical environments.

US-2007/0057581-A1 discloses a system for generating power. A plurality of superconducting magnet pairs are disposed around a stationary coil in a circular pattern. A control processor applies power to turn on and off the electromagnet pairs in a predetermined sequence. Rotational magnetic fields are generated and a current flow is induced in the stationary coil. The electromagnets include coils wrapped around a soft iron core. The electromagnets including the cores are driven with a DC drive current. Although interesting, the system of US-2007/0057581-A1 would be disregarded by a skilled man due to lack of detail and practicality. For instance, it is suggested that the induced current can be used to produce electricity for homes, businesses, or could be part of an electric-powered vehicle thus eliminating the need for re-fueling. To increase the efficiency of the system, it is suggested to use superconducting electromagnets, which must be cooled to temperatures approaching absolute zero (0 K). The current flowing out of the system can be directed back into the system, towards cooling elements for cooling the superconducting magnets and towards the control processor. The control processor itself is supposed to be well-known and is not fully disclosed.

A skilled man will disregard US-2007/0057581-A1 due to the perpetual motion-like description. In practice the system of US-2007/0057581-A1 will be more inefficient than any of the systems for contact-less energy transfer disclosed in the introduction, for instance due to the power needed to cool the superconducting magnets. Besides, the system of US-2007/0057581-A1 is directed to large-scale applications such as powering buildings or vehicles.

In an embodiment, each primary coil pair is provided with one or more switches for short circuiting the respective primary coil pair. Optionally, the charger comprises a processor for driving the AC power source, wherein the processor is adapted to short circuit at least one of the primary coil pairs using the corresponding switches, and to provide the supply the alternating current to the remaining primary coil pairs. Short circuiting some of the primary coil pairs provides a more homogeneous magnetic field. The efficiency and magnetic coupling are increased, thus limiting energy loss. The magnetic coupling can increase for instance up to three times compared to a charger lacking the appropriate circuitry.

In an embodiment, the charger comprises a cover of high magnetic permeability material that encloses the outside of the primary coils. Although electromagnetic radiation of the above-described charger is within regulatory limits, the cover can lower electromagnetic radiation down to a predetermined level, thus enabling lower electromagnetic emissions outside the charger.

According to another aspect, the present invention provides a method to inductively provide power to one or more battery powered appliances, each appliance comprising a secondary coil for enclosing part of a magnetic field and in response generating a current for charging a battery of the appliance, the method comprising the steps of:
  providing a charger including two or more primary coil pairs that are arranged in a circular pattern, wherein the circular pattern is adapted for enclosing the one or more secondary coils of the appliances, and
  using an AC power source for providing an alternating current (AC) to the primary coil pairs for generating a rotating magnetic field between respective primary coils of the primary coil pairs.

The method provides all the advantages related to the above disclosed charger.

Additional features and advantages of the charger of the present invention will be apparent from the detailed description below, in combination with the enclosed drawings.

DETAILED DESCRIPTION OF EXAMPLES

Figure 1:
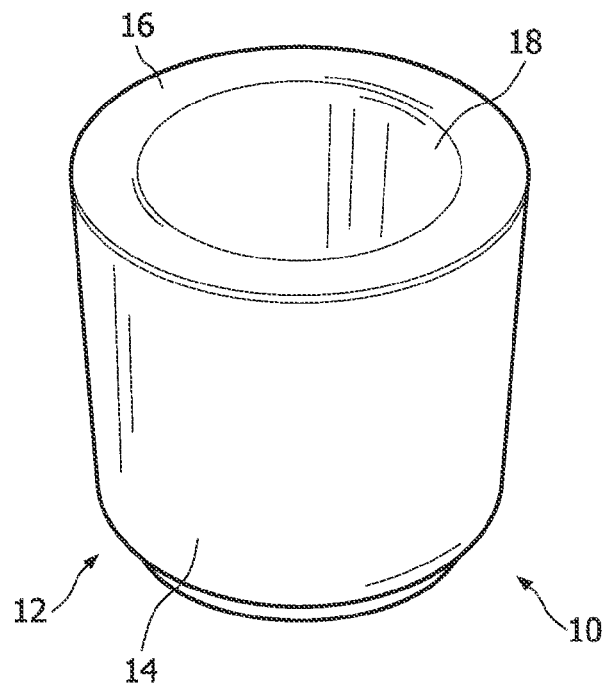
FIG. 1 shows a perspective view of an inductive charger of the system of the present invention.

A contactless, inductive charger 10 according to the invention comprises a container 12. The container is for instance a cup including an outer cup-shaped member 14 and an inner cup-shaped member 16. A number of primary coils is arranged in a circular pattern along the circumference and in between the walls of the cup-shaped members 14 and 16. The primary coils are arranged in pairs, wherein each primary coil pair includes two opposing coils. I.e., a first pair includes coils L1 and L5, a second pair includes coils L2 and L6, etc. The embodiment of FIG. 1 comprises eight coils L1 to L8, and four coil pairs. Cup-shaped member 16 defines on its inside a space 18 wherein one or more battery powered appliances can be arranged for charging.

Each primary coil is a wire coil, without a core of magnetic material. Otherwise, the core would counteract the AC drive current due to the remanence of the magnetic material.

Figure 3A:
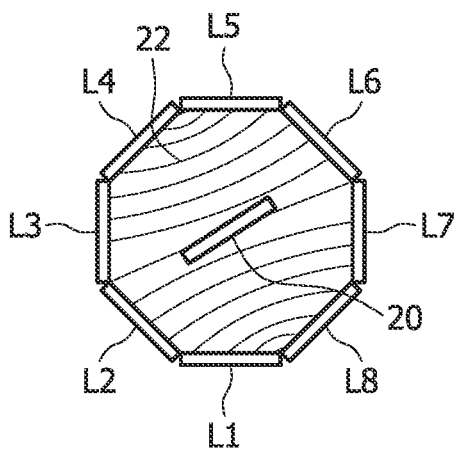
FIGS. 3A-3D show diagrams of a top view of the system of the invention, including consecutive steps of the rotating magnetic field.
Figure 3B:
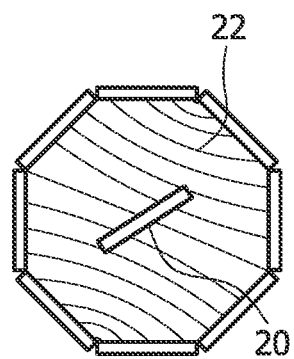
Figure 3C:
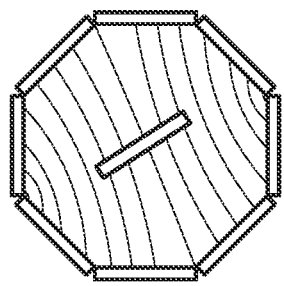
Figure 3D:
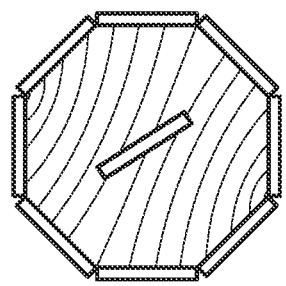

For inductively transferring power, an appliance comprising a secondary coil 20 is arranged within the circle of the primary coil pairs (FIG. 3A). The primary coil pairs are subsequently provided with an alternating current (AC) for generating a rotating magnetic field. Magnetic field lines 22 are shown in FIGS. 3A to 3D. By sequentially driving the coil pairs L1/L5, L2/L6, L3/L7 and L4/L8 the magnetic field rotates around the secondary coil 20. The coils are for instance subsequently driven as follows:

1. Coils L1-L4 generate a magnetic field towards opposing coils L5-L8 (FIG. 3A);
2. Coils L2-L5 generate a magnetic field towards opposing coils L6-L1 (FIG. 3B);
3. Coils L3-L6 generate a magnetic field towards opposing coils L7-L2 (FIG. 3C);
4. Coils L4-L7 generate a magnetic field towards opposing coils L8-L3 (FIG. 3D), etc.

Figure 4:
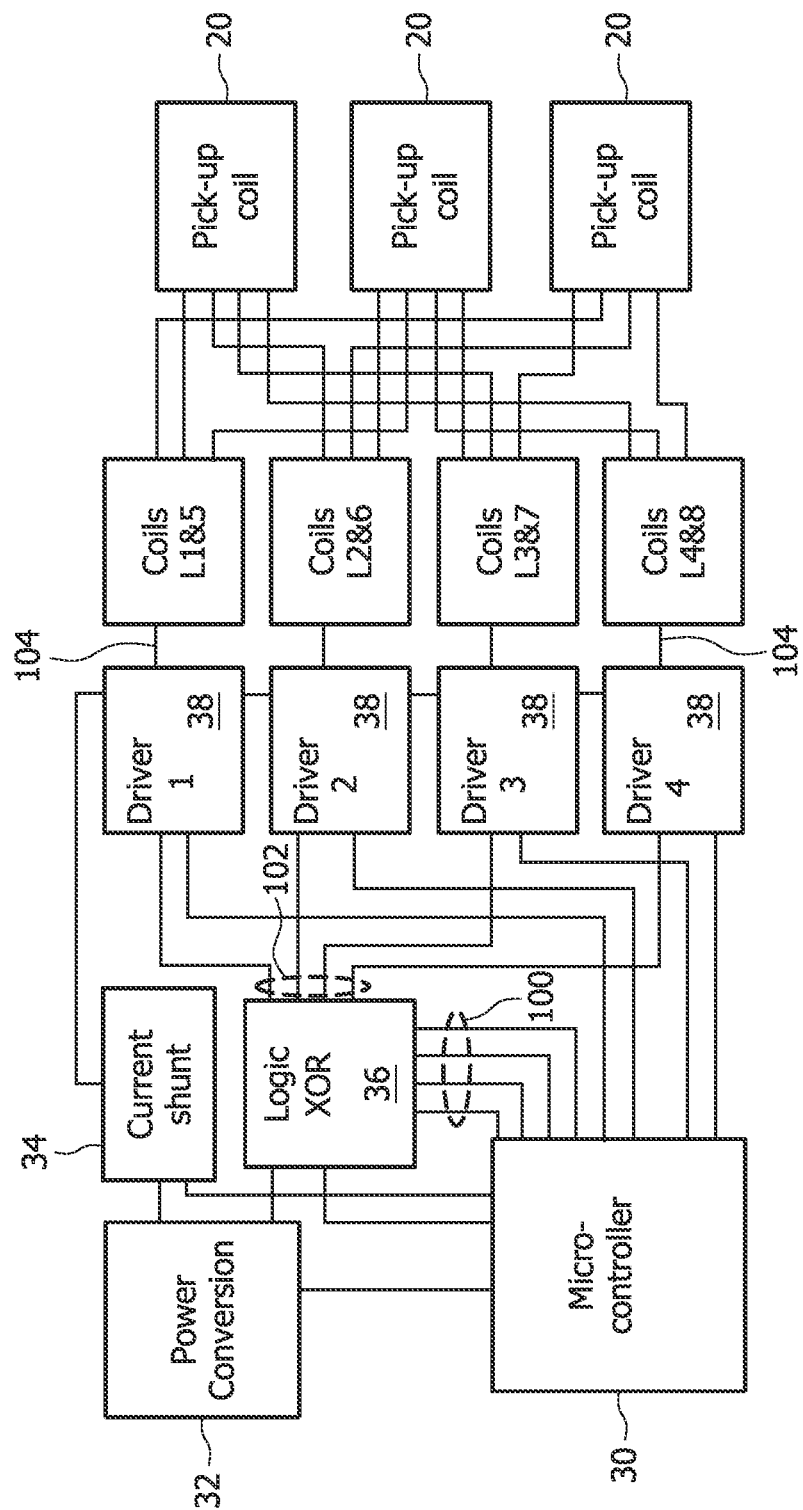
FIG. 4 shows a diagram of the system of the invention.

FIG. 4 shows microcontroller 30 connected to a power conversion circuit 32, a current shunt 34, a logical exclusive disjunction (XOR) 36, and four drivers 38 that are operable by the microcontroller. The logical operation exclusive disjunction, also called exclusive or, (for instance symbolized XOR or EOR), is a type of logical disjunction on two input operands that results in a value of true if and only if exactly one of the operands has a value of true.

The power conversion circuit 32 is an input circuit for converting electrical power from an external source, for instance mains voltage, to a format that is suitable for the charger 10. In a practical embodiment, the power conversion circuit 32 for instance converts an alternating mains voltage (e.g. 110-130 or 220-240 VAC) to a DC voltage in the range of for instance 5 to 15 V. The DC voltage powers the microcontroller 30, and is supplied to the drivers 38.

The microcontroller 30 generates a square wave voltage 100. The voltage 100 is supplied to the logic XOR 36. The microcontroller drives the XOR 36 to control the phase of square wave voltage 102 of the XOR 36. The XOR 36 supplies the square wave voltage 102 to drivers 38. Each driver 38 converts the square wave voltage 102 in a square wave voltage 104. The driver 38 supplies the square wave voltage 104 to a series connection of a capacitor and a coil pair.

The current shunt 34 is on one end connected to the microcontroller 30 and to the power conversion circuit 32. On the other end, the current shunt is connected to the drivers 38. The current shunt provides information to the microcontroller (for instance amplitude) regarding the alternating output current 106 of the drivers 38.

Figure 5C:
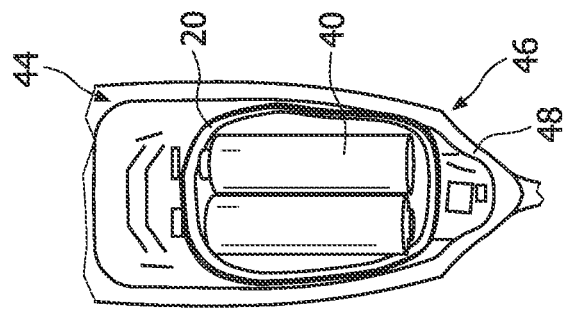
FIGS. 5A-5C show exemplary cut-away side views of battery powered appliances of the present invention.
Figure 5B:
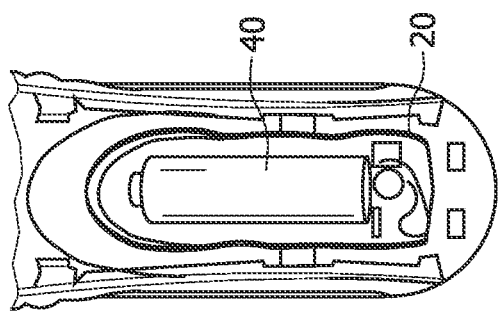
Figure 5A:
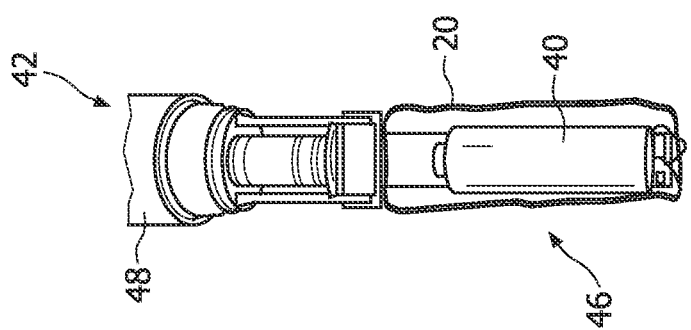

The battery powered appliances that can be charged using the charger of the present invention comprise one or more batteries 40. In general, the batteries 40 are cylindrical, and extend along the length of the appliance (FIGS. 5A, 5B, 5C). FIG. 5A shows a Philips Sonicare electrical toothbrush 42 including one battery. FIG. 5B shows a Philips electrical beard trimmer including one battery. FIG. 5C shows a Philips electrical shaver 44 including two batteries.

A battery compartment 46 of the appliance, including the batteries and for instance a printed circuit board etc., is in general located at the base or handle of the device. The battery compartment is the heaviest part of the device and it therefore forms the part of the device that the user will hold in his hand during use. As the battery compartment is the heaviest part, it will also be the part that will be placed in the charger 10 for charging.

Figure 2:
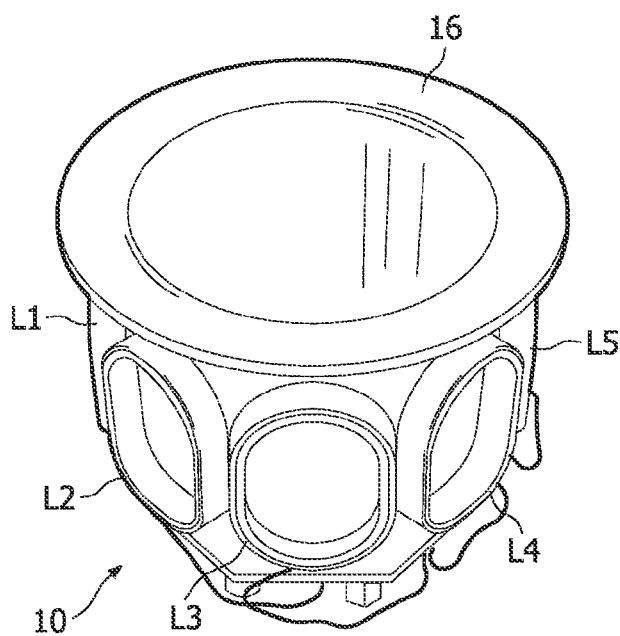
FIG. 2 shows a cut-away perspective view of the charger of FIG. 1.

To be able to transfer energy to the secondary coils, they must be aligned with the primary coils L1-L8, which are arranged vertically (FIG. 2). However, prior art appliances generally have secondary coils that are arranged otherwise.

According to the invention, the body 48 of the devices is modified and the secondary coil 20 encloses the length of the battery (FIGS. 5A, 5B). The secondary coil 20 consumes relatively little space and the size of the body 48 will be comparable with the prior art device. The width of the secondary coil 20 is limited by the inner diameter of the body 48. The length of the secondary coil can extend along the length of the inner walls of the body 48. The larger the secondary coil 20 is, the more magnetic flux it can enclose and the higher the magnetic coupling coefficient can be.

Figure 6:
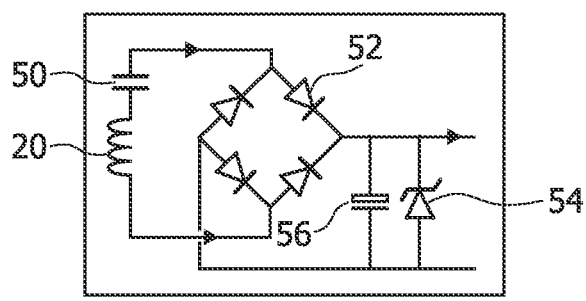
FIG. 6 shows circuitry included in the battery powered appliances.

Appliances that are already suitable for contactless charging, like the Philips Sonicare toothbrush, can be provided with a vertically arranged secondary coil 20. Besides, the appliance can be provided with a capacitor 50 that is arranged in series with the secondary coil 20 (FIG. 6). Together with the secondary coil 20, the capacitor 50 forms a resonance circuit having one or more resonance frequencies. The alternating voltage provided to the primary coils L1-L8 will have a frequency substantially corresponding to one of said resonance frequencies. Thus, (parasitic) impedances in the drive circuits can be compensated for, decreasing energy losses and improving efficiency.

Appliances that are not yet suitable for contactless charging are provided with a rectifier 52 in series with the coil 20 and capacitor 50. A Zener diode 54 for voltage limitation is connected to the output of the rectifier 52. Optionally, a buffer capacitor 56 is arranged in parallel to the diode 54 (FIG. 6).

In an improved embodiment (not shown), the appliances 42, 44 may be provided with two or more secondary coils, each secondary coil having another orientation. For instance, two secondary coils can be perpendicular to each other. As the magnetic field rotates (FIGS. 3A-3D), always one of the secondary coils will enclose magnetic flux, thus decreasing the time needed to fully charge the battery.

Figure 7:
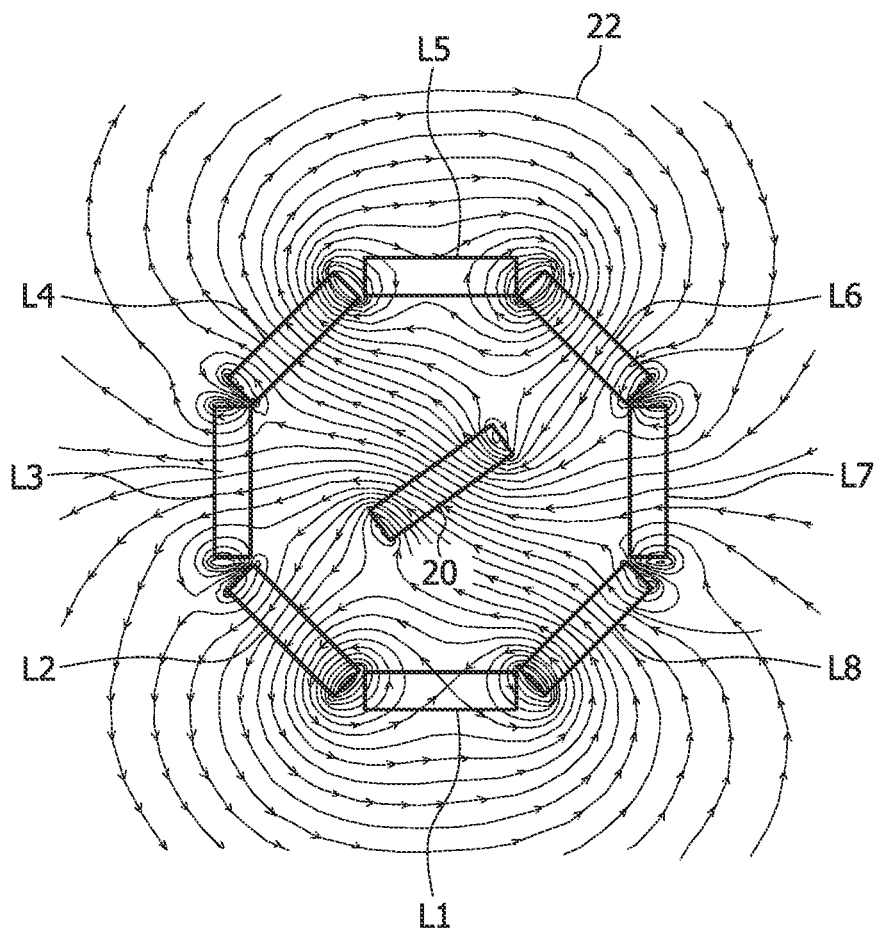
FIG. 7 shows a diagram of magnetic field lines of an embodiment of the present invention.

In an improved embodiment, one or more primary coil pairs are short circuited, whereas the remaining primary coil pairs are provided with the alternating current. Magnetic field lines 22 are shown in FIG. 7, when primary coils L1/L5 are short circuited and the remaining primary coils are provided with an alternating current.

Short circuiting some of the primary coil pairs reduces short circuiting of the magnetic flux. The net magnetic flux through the short circuited coils equals zero. This increases the magnetic coupling coefficient $k_{21}$ as a larger part of the magnetic flux $\Phi_1$ passes through the secondary coil(s).

In a practical embodiment, one or two primary coil pairs are short circuited. If the charger comprises three or four coil pairs, two or three primary coil pairs will be provided with the alternating current. Tests have proven the latter to be most efficient, provide the highest coupling coefficient, and the most homogeneous magnetic field.

Figure 8:
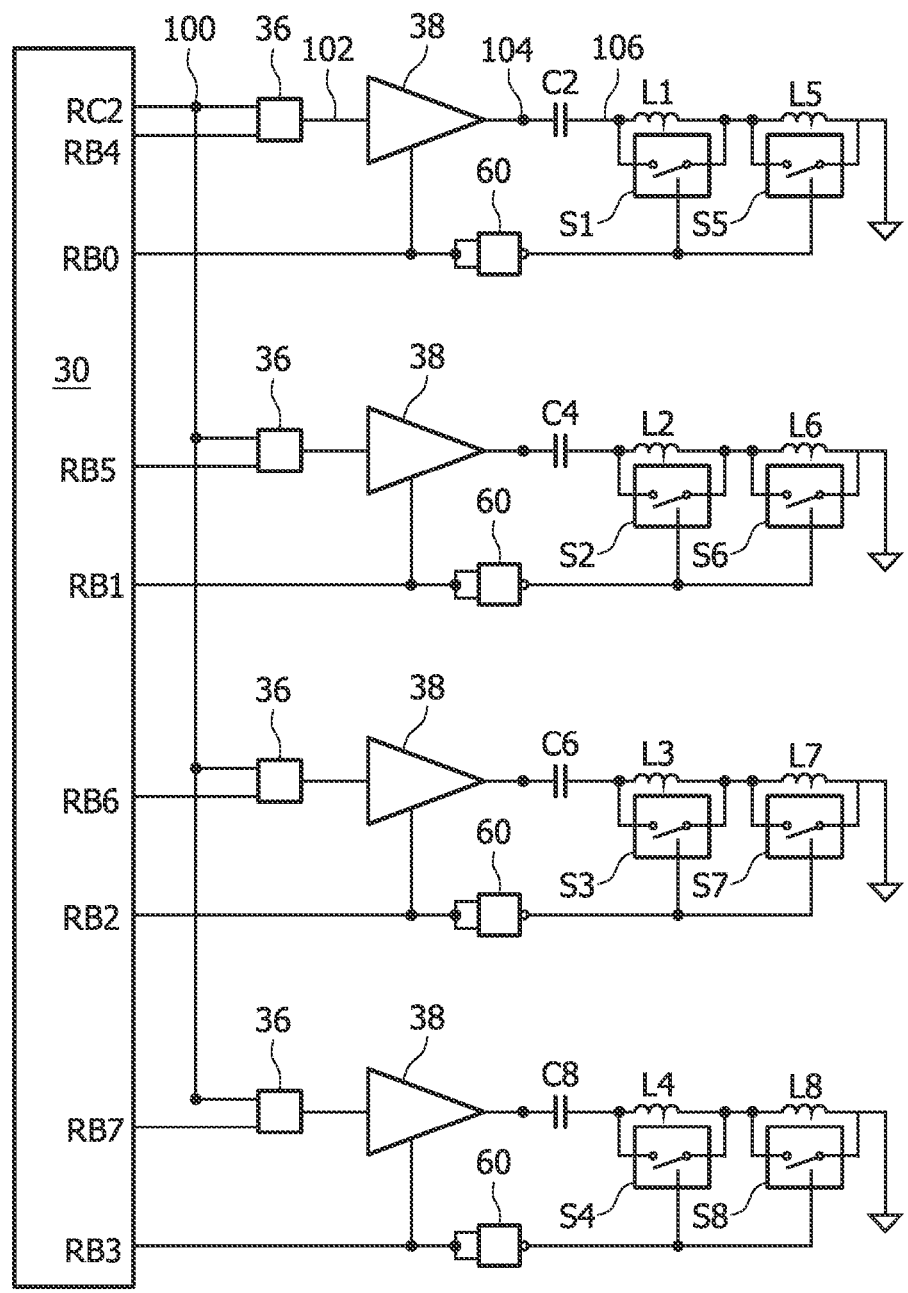
FIG. 8 shows a diagram of another embodiment of the inductive charger of the invention.

FIG. 8 shows a charger comparable to the charger of FIG. 4, including switches S1-S8 for short circuiting the respective primary coils L1-L8. Each primary coil pair is in series connected with a capacitor (C2, C4, C6, C8), a driver 38, and an XOR 36. The microprocessor 30 supplies a signal 100 to a first input of each XOR 36. The signal 100 is for instance a square wave high frequency voltage signal. Outputs RB0, RB1, RB2, RB3 supply a first timing signal to the drivers 38. The first timing signal turns the drivers 38 ON (e.g. when the respective first timing signal is high) and OFF (e.g. when the first timing signal is low).

The first timing signal is also supplied to inverters 60. Each inverter inverts the input first timing signal and outputs an inverted first timing signal 61. The inverted signal has a high value at the time when the input first timing signal has a low value, and a low value at the time when the input first timing signal has a high value. Each inverter 60 supplies the inverted first timing signal 61 to the switches S1-S8. The inverted first timing signal 61 opens (when the signal 61 is low) and closes (when the signal 61 is high) the switches S1-S8. Consequently, the switches S1-S8 are open (do not conduct) when the corresponding driver 38 is ON. The switches S1-S8 are closed (i.e. conduct, and thus short-circuit the coils L1-L8) when the corresponding driver 38 is OFF.

Outputs RB4, RB5, RB6, RB7 supply a second timing signal to the second input of the respective XOR 36. If the second timing signal is low, the output signal 102 of the XOR 36 corresponds to the input signal 100. If the second timing signal is high, the XOR 36 inverts the input signal 100. In the latter case, the output signal 102 is high when the input signal 100 is low, and the output signal 102 is low when the input signal 100 is high.

The output 102, for instance a square wave high frequency voltage, is supplied to the drivers 38. The drivers transform the voltage 102 into a voltage 104 having the same frequency as the voltage 102.

Optionally, capacitors C2-C8 are connected in between the drivers 38 and the coils L1-L8. The drivers 38 supply the voltage 104 to the series connection of capacitors C2, . . . C8 and the corresponding coil pair. Due to the capacitors C2, . . . C8, a filtered drive current 106 is supplied to the coils L1, . . . L8. Preferably, the frequency of the voltage 104 and the drive current 106 corresponds to a resonance frequency of the series connection of the capacitors C2, . . . C8 and the corresponding coils L1-L8.

Figure 9:
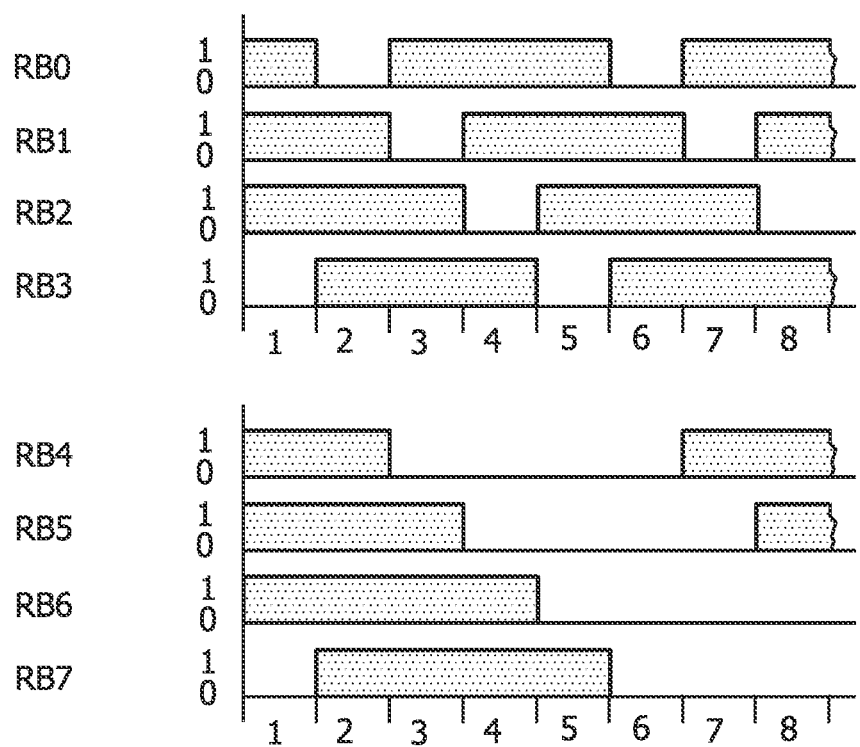
FIG. 9 shows timing diagrams of drive signals of the charger.

FIG. 9 shows an example of the outputs of RB0, RB1, RB2, RB3 (first timing signal) and RB4, RB5, RB6, RB7 (second timing signal). In the example of FIG. 9, a driver 38 of a primary coil pair is activated (by the first timing signal) during three of every four timing units. The driver 38 is deactivated every fourth timing unit (indicated at the x-axis of the diagrams).

In more general terms, the above described exemplary embodiment (FIGS. 8, 9) uses first and second timing signals (RB0, . . . RB7) to supply a high frequency voltage 104 subsequently to adjacent primary coil pairs. The voltage 104 is supplied to the first, second, third and fourth primary coil pair respectively. Subsequently, the first timing signal (RB0-RB3) changes the phase of the voltage 102 of the XOR 36. The voltage 104 and the drive current 106 have a phase that corresponds to the phase of the signal 102. The voltage 104 is again supplied to the first, second, third and fourth primary coil pair respectively, thus generating a continuously rotating magnetic field between the primary coils.

The frequency of the respective signals RB0, . . . , RB7 (FIG. 9) determines the rotational frequency of the magnetic field 22. In a practical embodiment, the frequency of the signals RB0, . . . RB7 is chosen such that the magnetic field rotates at a speed that is at least 1000 times below the frequency of the signal 100 (FIG. 8). These frequencies enable the charger 10 to have a relatively high power transmission coefficient, and at the same time to have a size that is convenient, i.e. small enough, for use at home, such as in a bathroom.

The signal 100 is for instance a square wave voltage, having a frequency in the range of about 10 kHz to 1 MHz, for instance about 100 kHz. Optionally, the frequency of signals RB0, RB1, RB2, RB3 is about 1000 to 10,000 times lower than the frequency of the high frequency signal 100, for instance in the range of a few Hertz to several kHz. The second timing signals RB4, RB5, RB6, RB7 have a frequency corresponding to the signals RB0, RB1, RB2, RB3.

Figure 10:
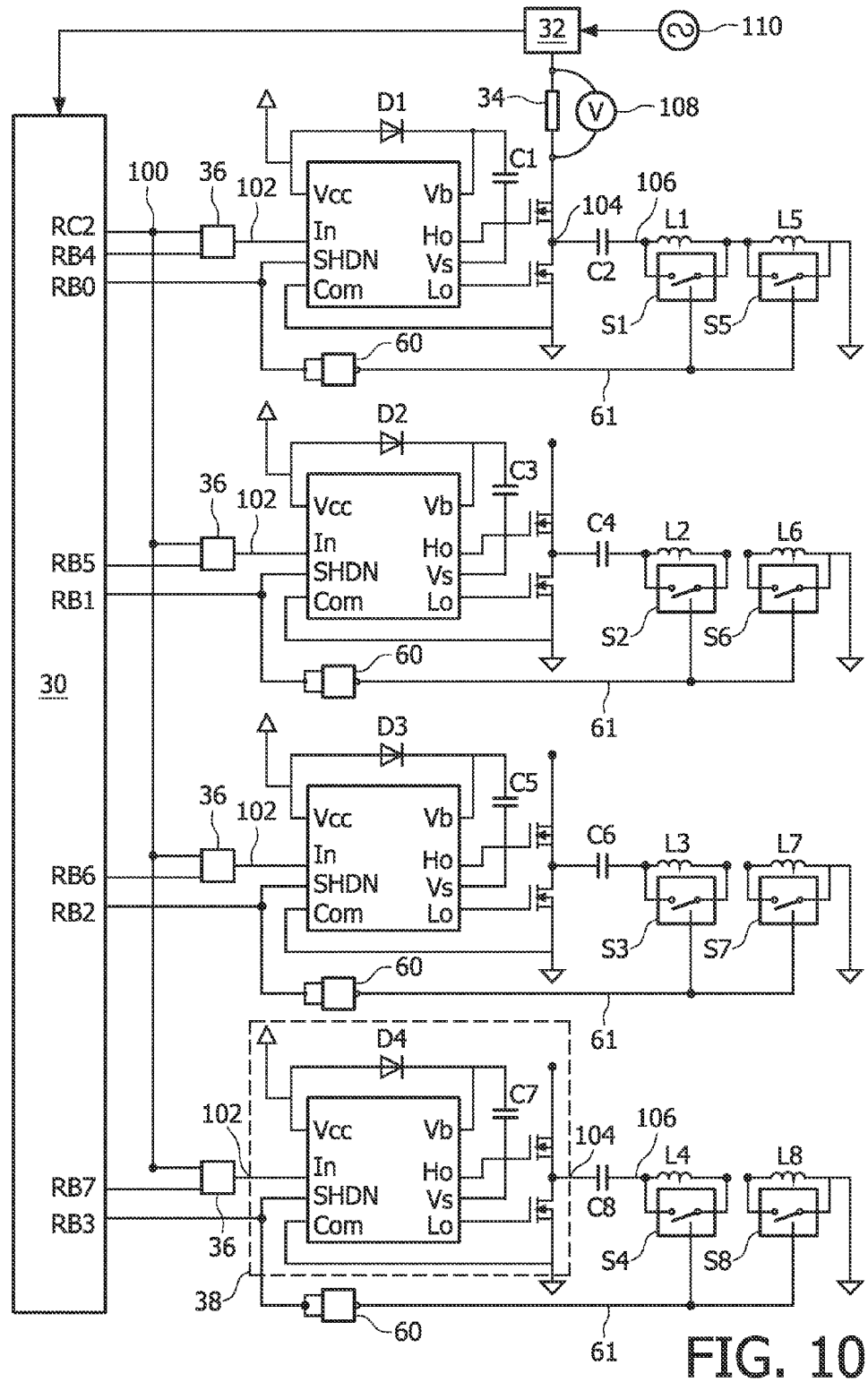
FIG. 10 shows a more elaborate diagram of the charger of FIG. 8.

FIG. 10 shows a more detailed exemplary embodiment of the charger of FIG. 8, wherein like elements are provided with the same reference numerals. Each driver 38 comprises a half-bridge commutator, comprising switches T1, . . . , T8. The switches comprise for instance a MOSFET or transistor. The switches are connected to a DC voltage source, such as the power converter 32. The power converter is connected to an external power source 110 such as mains. The current shunt 34 may be connected in between the power converter 32 and the switches. The current shunt 34 is for instance a resistor having a relatively low resistance (FIG. 10). A voltage meter 108, which is for instance included in the controller 30, measures the voltage over the resistor 34. The controller 30 calculates the output drive current 106, using the measured voltage and the resistance of the resistor 34.

The drivers 38 supply the drive voltage 104, having the same frequency and phase as the input signal 102, to the series connection of the capacitors C2, . . . C8 and the primary coils L1-L8. The capacitors supply a filtered drive current 106 to the primary coils L1-L8.

Figure 11:
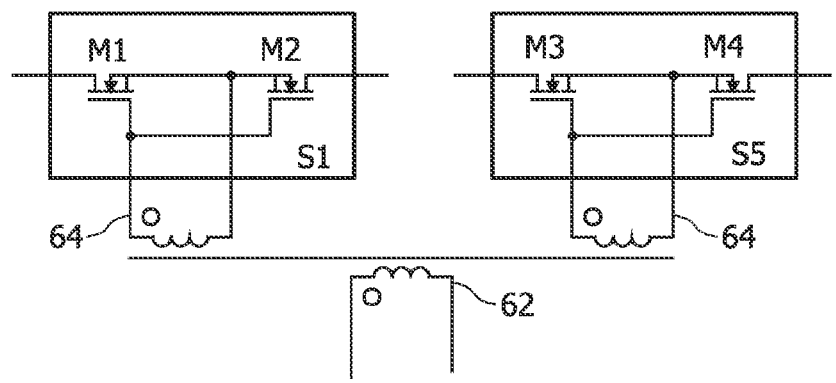
FIG. 11 shows a diagram of circuitry for short circuiting primary coils.

FIG. 11 shows a practical, exemplary embodiment of the switches S1-S8. Each switch comprises two n-type MOSFETs M1, M2, M3, M4 connected in anti-series, i.e. having their diodes connected in opposite direction. The inverted first timing signal is supplied to the primary coil 62 of a transformer, and the MOSFETs are connected to secondary coils

64 of the transformer. Thus, the inverted first timing signal can simultaneously open or close the MOSFETs.

In an embodiment, the microprocessor 30 determines, using input of the current shunt 34 (FIGS. 4, 10), a direction of the magnetic field lines 22 having a peak load. As the driver 38 is not an ideal current source, the drive current 106 will increase when the power transfer to a secondary coil 20 increases. Measuring the input current of the half bridge circuit T1-T8 of the drivers 38 via the shunt 34 provides a convenient and suitable indication of the amplitude of the filtered drive current 106. The peak load implies that the energy transfer from the primary coils to the one or more secondary coils 20 has a maximum. The position of maximum energy transfer will correspond to the position where the amplitude of the filtered drive current 106, and consequently the current via the shunt 34, is the highest.

After determining the position of the field lines at which the energy transfer is maximal, the rotation of the magnetic field is halted at substantially that position. The efficiency of the energy transfer is thus increased by skipping the positions of the magnetic field having the lowest energy transfer.

If two or more secondary coils are arranged inside the cup shaped charger 10, the magnetic field may have two or more positions at which the energy transfer has a (local) maximum. The microprocessor can determine said two or more positions, and switch the magnetic field between said positions. By skipping the positions having the lowest energy transfer, the efficiency of the system increases.

In use, the magnetic field generated by the primary coils extends outside the cup 10, as shown for instance in FIG. 7. However, it might be desirable to limit the flux density outside the cup 10 to protect any item outside the cup (for instance electrical circuits, bank cards, batteries) from the electromagnetic field.

Figure 12:
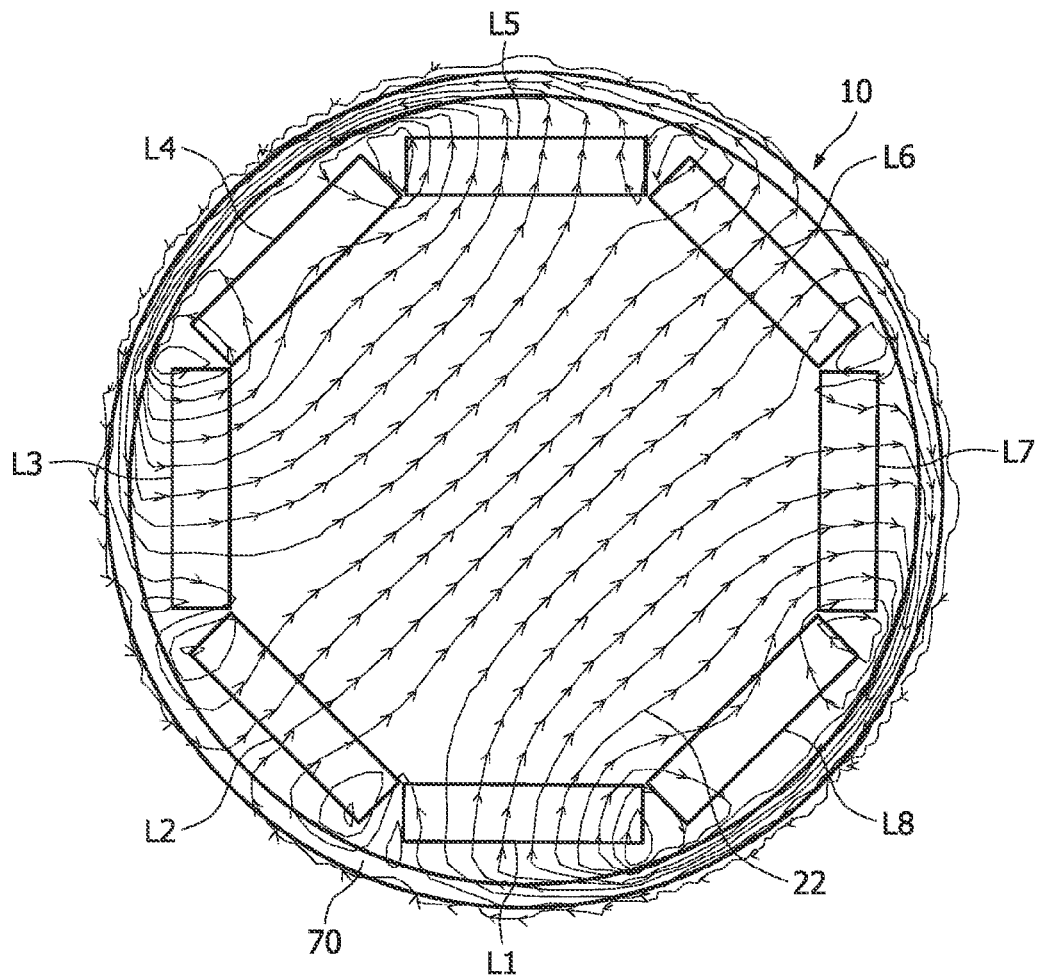
FIG. 12 shows a top view including magnetic field lines of an embodiment of the charger of the present invention.

FIG. 12 shows the cup 10 and the primary coils L1-L8. The outside surfaces of the outer cup member 14 are covered with a high magnetic permeability material 70. The outside surfaces include the walls and/or the bottom of the outer cup-shaped member 14. High magnetic permeability is for instance a magnetic permeability $\mu$ of about 100 up to about 2000. High magnetic permeability materials include for instance steel, ferrite (for instance $ZnFe_2O_4$ or iron plus barium/strontium oxides), permalloy (nickel iron magnetic alloy), and/or mu-metal (a nickel-iron alloy comprising about 75% nickel, 15% iron, plus copper and molybdenum).

The cover 70 of high permeability material reduces the flux density outside the cup 10. Also, the cover increases the homogeneity of the flux density inside the cup. Thus, the cover enables the charging system of the present invention to increase the charging currents in the primary coils and thus reduce charging times, while still keeping electromagnetic radiation outside the cup 10 within regulatory limits. The electromagnetic radiation at a certain distance outside the cup can be reduced to a predetermined level by choosing the appropriate high magnetic permeability material, the thickness of the cover, and/or the primary coil current.

It may be desirable to also charge battery powered appliances that are unsuitable for or incompatible with the primary coils of the charging cup 10. Such apparatuses include many of the presently common bathroom appliances, including conventional rechargeable devices having an open electrical contact. Examples include Philips electrical shavers. The charging cup 10 of the present invention can be used to charge said devices also, given the examples below.

For instance, the cup 10 may be provided with a socket for one or more connectors. A connector can have a certain shape or setting, to identify the device to which it is attached. The device can thus be charged in a conventional way via a wire using the charger of the invention.

Figure 13:
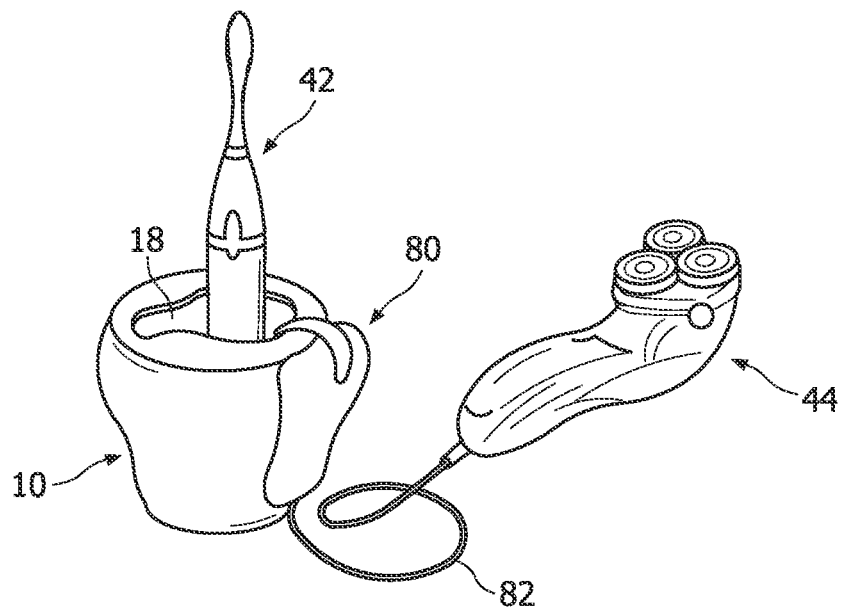
FIG. 13 shows a perspective view of an embodiment of the system of the present invention.

In another embodiment (FIG. 13), the device (for instance shaver 44) is connected to an adapter 80 via a wire 82. The adapter 80 comprises a secondary coil (not shown) and circuitry comparable to the circuitry shown in FIG. 6. The secondary coil of the adapter 80 has about the same size as the primary coils L1-L8. To charge the device, the adapter is arranged on the outside of the cup 10, wherein the secondary coil is substantially parallel to one of the primary coils.

Rendering the charger of the invention backwards compatible for charging presently common appliances also (see FIG. 13) will accelerate public acceptance of the system of the present invention.

Figure 14:
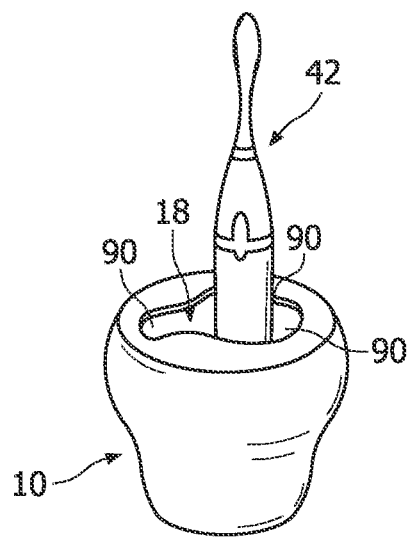
FIG. 14 shows a perspective view of another embodiment of the system of the present invention.

In still another embodiment, the inner space 18 of the cup 10 is provided with one or more recesses 90 (FIG. 14). The recesses 90 force an appliance, such as the electrical toothbrush, mechanically in a predetermined preferred position. The preferred position for instance optimizes the relative positions of the secondary coil with respect to one of the primary coils. In addition the recesses separate different appliances from each other, for instance to prevent a dirty toothbrush to touch a shaver.

In practice, the charger for instance has an inner diameter in the order of 5 to 15 cm, and a height in the order of 5 to 10 cm. The primary coils have diameters of for instance about 3 to 7 cm. The primary coils may for instance have a height in the order of 6 cm, and a width in the order of 4 cm. The secondary coils are as large as the corresponding appliance allows, for optimizing the coupling coefficient. The size of the secondary coils may for instance be comparable to the size of one primary coil.

The above described charger can include two or more primary coil pairs. In view of efficiency, homogeneity of the magnetic field, and costs related to the driving circuits, preferred embodiments include three or four primary coil pairs.

Magnetic coupling coefficients can be in the order of about 0.07 (when activating one primary coil pair at a time) to 0.12 (for instance when activating three out of four coil pairs at a time). The coupling coefficients can be further improved using some of the embodiments described above, such as short circuiting non-activated primary coil pairs. When short circuiting one or two coil pairs and driving all remaining coil pairs, the magnetic coupling coefficient $k_{21}$ can be raised to about 0.3. Tests have proven that the induced current in the secondary coil(s) can increase up to three times when short circuiting of (for instance one or two) primary coil pairs. Besides, due to the improved homogeneity of the magnetic field inside the charger, short circuiting primary coil pairs renders the positioning of the secondary coil(s) inside the charger less critical.

The primary coils are for instance supplied with an alternating voltage 104 having a frequency in the range of about 50 to 150 kHz. Increasing the frequency of the voltage enables the use of smaller coils, which is an advantage when the charger is intended for use in bathrooms. The alternating drive current 106 of the primary coils is for instance in the range of 0.5 to 1 A, which is sufficient for creating magnetic fields for charging bathroom appliances. Electromagnetic fields outside the charger 10 will, at a primary coil current up to 1 A, fall within (relatively strict) European regulatory limits.

The microcontroller is for instance a Microchip™ PIC16F876. Said microcontroller can generate the operating frequency of the primary coil current in the 50-150 kHz range. The current amplifiers are for instance half-bridge circuits equipped with level-shifters from International Rectifier™

In an embodiment, the charger 10 has a first mode and a second mode. In the first mode, the charger transfers energy from its primary coils to one or more secondary coils inside the charger. The second mode is a stand-by mode, wherein the primary coil current is significantly reduced (for instance 10 to 100 times). The charger automatically switches to the stand-by mode when the energy transfer drops below a predetermined level. The microprocessor interprets the drop below the predetermined level as the absence of a secondary coil. If subsequently an appliance having a secondary coil is arranged inside the charger, the primary coil current will suddenly change. In response, the microprocessor increases the primary coil current up to a level associated with the charging mode.

In an improved embodiment, the microprocessor has a stand-by mode, i.e. the second mode. Periodically, the microprocessor 30 wakes from the stand-by mode and detects whether the charger 10 contains one or more chargeable appliances. If the charger comprises a chargeable appliance, the processor 30 starts charging the battery thereof. If the charger does not comprise a chargeable appliance, the processor 30 returns to the stand-by mode during a predetermined period. The predetermined period is for instance in the range of a few seconds up to several minutes, for instance 2 seconds to 5 minutes. Switching the processor between the stand-by mode and the first active mode saves energy. Also, chargeable appliances within the charger will always be detected.

The system of the present invention is suitable for charging common type AA or type AAA rechargeable batteries at usual rates. Charging times will be in the order of several hours, i.e. 5 to 15 hours for fully charging one or more batteries. These charging times are comparable with charging times of chargers that require accurate alignment of the primary and secondary coils. The latter include for instance a common electrical toothbrush such as the Braun Oral B Plak Control.

The invention is not limited to the embodiments as described above, wherein many modifications are conceivable within the scope of the appended claims.

The invention claimed is:

1. A charger apparatus comprising:
   one or more appliances, each appliance being powered by a battery and comprising a secondary coil for generating a current for charging the battery; and
   a charger comprising a plurality of primary coil pairs arranged in a circular pattern with coils of each pair positioned opposite each other, each primary coil pair including one or more switches for short circuiting the respective primary coil pair, the circular pattern enclosing the secondary coils of the one or more appliances placed in the charger;
   wherein, when an alternating voltage is provided to the plurality of primary coil pairs, a rotating magnetic field between respective primary coil pairs of the plurality of primary coil pairs is generated thereby inducing current in the secondary coils.

2. The charger apparatus of claim 1, further comprising a processor for driving the AC power source, wherein the processor is configured to short circuit at least one of the plurality of primary coil pairs using the corresponding switches, and to supply the alternating voltage to remaining of the plurality of primary coil pairs.

3. The charger apparatus of claim 1, further comprising four primary coil pairs.

4. The charger apparatus of claim 1, wherein the alternating voltage has a frequency of about 10 kHz or more.

5. The charger apparatus of claim 1, wherein the magnetic field is rotated at a frequency that is more than 1000 times below a frequency of the alternating voltage.

6. The charger apparatus of claim 1, wherein the alternating voltage is provided at a frequency that substantially corresponds to a resonance frequency of the one or more appliances.

7. The charger apparatus of claim 1, further comprising a cover of high magnetic permeability material that encloses the plurality of primary coil pairs.

8. A method to inductively provide power to appliances, the method comprising the acts of:
   providing or more appliances, each appliance being powered by a battery and comprising a secondary coil for generating a current for charging the battery;
   arranging a plurality of primary coil pairs in a circular pattern with coils of each pair positioned opposite each other, each primary coil pair including one or more switches for short circuiting the respective primary coil pair, the circular pattern enclosing the secondary coils of the one or more appliances;
   providing an alternating voltage to the plurality of primary coil pairs; and
   generating a rotating magnetic field between respective primary coil pairs of the plurality of primary coil palm thereby inducing current in the secondary coils.

9. The method of claim 8, further comprising the acts:
   short circuiting at least one of the plurality of primary coil pairs; and
   supplying the alternating voltage to remaining plurality of the primary coil pairs.

* * * * *

UNITED STATES PATENT AND TRADEMARK OFFICE
CERTIFICATE OF CORRECTION

PATENT NO. : 8,810,196 B2
APPLICATION NO. : 13/061957
DATED : August 19, 2014
INVENTOR(S) : Ettes et al.

It is certified that error appears in the above-identified patent and that said Letters Patent is hereby corrected as shown below:

In the Claims,

Column 11, line 42, should read as follows,

Claim 1. A charger apparatus comprising:
one or more appliances, each appliance being powered by a battery and comprising a secondary coil for generating a current for charging the battery; and
a charger comprising a plurality of primary coil pairs arranged in a circular pattern with coils of each pair positioned opposite each other, each primary coil pair including a switch that short circuits the respective primary coil pair when closed, the circular pattern enclosing the secondary coils of the one or more appliances placed in the charger; and
a capacitor connected in series with a corresponding primary coil pair, wherein the alternating voltage is provided at a frequency that corresponds to a resonance frequency of the capacitor and the corresponding primary coil pair,
wherein, when an alternating voltage is provided to the plurality of primary coil pairs, a rotating magnetic field between respective primary coil pairs of the plurality of primary coil pairs is generated thereby inducing current in the secondary coils.

Column 12, line 28, should read as follows,

Claim 8. A method to inductively provide power to appliances, the method comprising the acts of:
providing one or more appliances, each appliance being powered by a battery and comprising a secondary coil for generating a current for charging the battery;
arranging a plurality of primary coil pairs in a circular pattern with coils of each pair positioned opposite each other, each primary coil pair including a switch that short circuits the respective primary coil pair when closed, the circular pattern enclosing the secondary coils of the one or more appliances;
providing an alternating voltage to the plurality of primary coil pairs;
generating a rotating magnetic field between respective primary coil pairs of the plurality of primary coil pairs thereby inducing current in the secondary coils;

Signed and Sealed this
Tenth Day of February, 2015

Michelle K. Lee
*Deputy Director of the United States Patent and Trademark Office* providing a capacitor connected in series with a corresponding primary coil pair,
wherein the alternating voltage is provided at a frequency that corresponds to a resonance frequency of the capacitor and the corresponding primary coil pair.